No. 841,109. PATENTED JAN. 15, 1907.
S. BRAMLEY-MOORE.
CHANGE SPEED GEARING.
APPLICATION FILED MAR. 30, 1906.
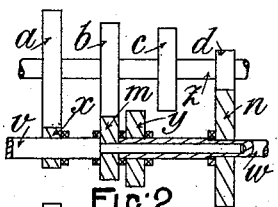
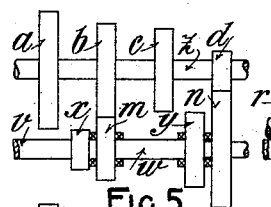
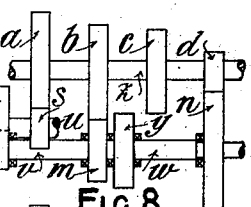
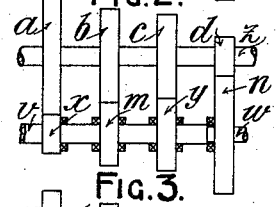
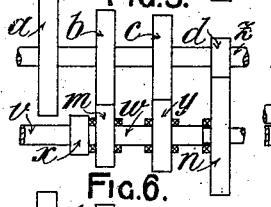
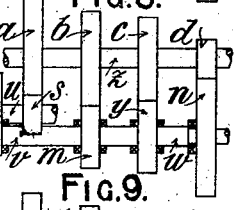
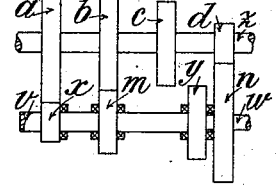
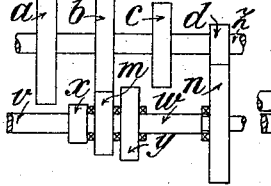
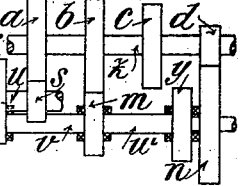
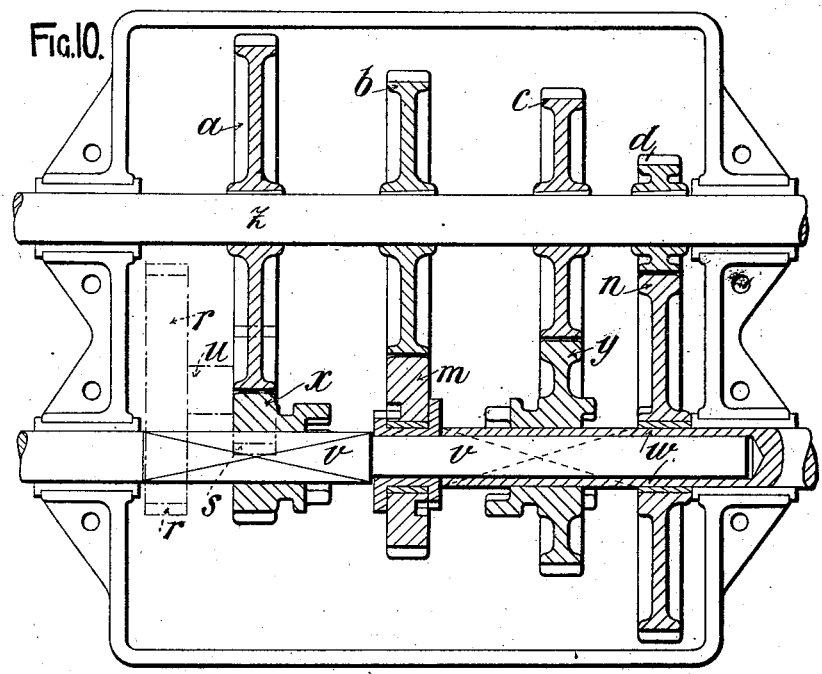
WITNESSES.
G. V. Symes.
Edward L. George.
INVENTOR.
S. Bramley-Moore.
Per Robert E. Phillips.
Attorney.

UNITED STATES PATENT OFFICE.

SWINFEN BRAMLEY-MOORE, OF BLOOMSBURY, ENGLAND.

CHANGE-SPEED GEARING.

No. 841,109.      Specification of Letters Patent.      Patented Jan. 15, 1907.

Application filed March 30, 1906. Serial No. 308,896.

*To all whom it may concern:*

Be it known that I, SWINFEN BRAMLEY-MOORE, a subject of the King of Great Britain and Ireland, residing at 26 Russell Square, Bloomsbury, in the county of London, England, have invented a new and useful Improvement in Change-Speed Gearing, of which the following is a full and complete specification.

This invention relates to an improved change-speed gear particularly adapted for motor road-vehicles of the kind comprising a driving and driven shaft arranged in line, a counter-shaft parallel to said shafts, and trains of gearing connecting said shafts, the object being to obtain a greater number of velocity ratios with the same number of wheels or an equal number of velocity ratios with a lesser number of wheels than at present obtains.

In the accompanying drawings, which illustrate this invention, Figures 1 to 9, inclusive, are diagrammatic views of a gear consisting of ten wheels, which give six forward speeds and three reverse speeds. Fig. 10 is a view in plan of such a gear arranged for use in motor road-vehicles.

Throughout the views similar parts are marked with like letters of reference.

The driving or engine shaft $v$ and the driven shaft $w$ are arranged in axial alinement with their abutting ends preferably arranged to mutually support one another by interengagement, as shown. The counter-shaft $z$ is arranged parallel with the driving and driven shafts, and on it are formed or fixed four spur-wheels $a$, $b$, $c$, and $d$, spaced at approximately equal distances apart. In permanent gear with the wheel $b$ on the counter-shaft is a wheel $m$, freely mounted on one or other of the axles $v$ and $m$ at their junction, so as to be free to rotate independently of either. A convenient method of doing this is to reduce the end of one axle to form a bearing on which the wheel $m$ can revolve, part of the said reduced end engaging a corresponding recess in the abutting end of the other axle. On the shaft $v$ is a sliding spur-wheel $x$, adapted to gear with the wheel $a$ on the counter-shaft, and on the shaft $w$ is both a sliding spur-wheel $y$, adapted to gear with the wheel $c$, and a wheel $n$ in permanent gear with the wheel $d$ on the counter-shaft. The wheel $n$ is free to rotate on the shaft $w$ independently of said shaft; but the wheels $x$ and $y$ are so mounted on their respective shafts as to have no independent rotary motion apart from said shaft, a convenient method being to form those parts of the shafts $v$ and $w$ on which the said wheels slide square, as shown in Fig. 10, the eyes in the bosses of the wheels being made of corresponding shape. These two wheels are, however, so mounted on their respective shafts as to be free to slide longitudinally thereon and are provided with any suitable form of shifting mechanism to effect such sliding movements.

The wheels $x$ and $n$ are provided on one side and the wheels $m$ and $y$ on both sides with teeth or serrations forming dog-clutches whereby the said wheels can be interlocked to produce the various changes of speed. With the wheels $x$ and $y$ both clutched to the wheel $m$, as shown in Fig. 6, the two shafts $v$ and $w$ are locked together, and therefore rotate at the same speed, giving what is known as a "direct" drive, the ratio of the speeds of the two shafts $v$ and $w$ being one to one. With the wheel $x$ clutched to the wheel $m$ and the wheel $y$ in gear with the wheel $c$, as shown in Fig. 5, the ratio of the speeds of the two shafts $v$ and $w$ is as four to three. With the wheel $x$ in gear with the wheel $a$ and the wheel $y$ clutched to the wheel $m$, as shown in Fig. 1, the ratio is two to one. With the wheel $x$ in gear with the wheel $a$ and the wheel $y$ in gear with the wheel $c$, as shown in Fig. 2, the ratio is eight to three. With the wheel $x$ clutched to the wheel $m$ and the wheel $y$ clutched to the wheel $n$, as shown in Fig. 4, the ratio is nine to two. With the wheel $x$ in gear with the wheel $a$ and the wheel $y$ clutched to the wheel $n$, as shown in Fig. 3, the ratio is nine to one.

The reverse-gear consists of a pair of wheels $r$ and $s$, fixed on a counter-shaft $u$, the wheel $s$ being in constant gear with the wheel $a$ on the counter-shaft $z$. When the wheel $x$ is in gear with the wheel $r$, the three reverse speeds are obtained as follows: wheel $y$ clutched to the wheel $m$, as shown in Fig. 7, giving a ratio of four to one, wheel $y$ in gear with the wheel $c$, as shown by Fig. 8, giving a ratio of sixteen to three, and wheel $y$ clutched to the wheel $n$, as shown in Fig. 9, giving a ratio of eighteen to one.

It will be seen that in the gearing produced by the arrangement of wheels shown in Figs. 1, 2, 5, 6, 7, and 8 the wheel $n$ is running idle. Consequently by dispensing with the two wheels $d$ and $n$ a gear consisting of eight wheels remains, giving four forward and two reverse speeds, the forward speeds being obtained with the wheels in the positions shown by Figs. 1, 2, 5, and 6 and the reverse speeds as shown by Figs. 7 and 8.

It will be seen that in producing the direct drive from the shaft $v$ to the shaft $w$ the counter-shaft $z$ is rotating idly on account of the wheel $m$ being permanently in gear with the wheel $b$. To avoid this and have no wheels or axles in motion on the direct drive except the driving and driven axles, the wheel $m$ instead of being mounted directly on one of the axles is mounted loosely on a sleeve $o$, which is mounted loosely on one of the axles, as shown in Fig. 10, both the wheel $m$ and the sleeve $o$ being formed with teeth or serrations, so that the wheels $x$ and $y$, as shown in Figs. 1 to 9, can engage either the sleeve $o$ to connect the shafts $v$ and $w$ together to produce the direct drive or both the sleeve $o$ and the wheel $m$ to produce the combinations shown by Figs. 1, 4, 5, 6, and 7.

What I claim, and desire to secure by Letters Patent, is—

1. A change-speed gear comprising a driving and a driven shaft arranged in the same axial line, a counter-shaft parallel with the said driving and driven shafts, a spur-wheel mounted freely at the junction of the driving and driven shafts, a spur-wheel fixed on the counter-shaft with which the aforesaid spur-wheel is in constant mesh, a sliding spur-wheel on the driving-shaft, a spur-wheel on the counter-shaft with which the sliding spur-wheel on the driving-shaft can engage, one or more spur-wheels on the driven shaft, one or more spur-wheels on the counter-shaft with which the spur-wheels on the said driven shaft engage and means for locking the spur-wheel mounted at the junction of the driving and driven shafts to either of the said shafts, or to both, as set forth.

2. A change-speed gear comprising a driving and a driven shaft arranged in the same axial line, a counter-shaft parallel with the said driving and driven shafts, a sleeve freely mounted at the junction of the driving and driven shafts, a spur-wheel freely mounted on said sleeve, a spur-wheel fixed on the counter-shaft with which the aforesaid spur-wheel is in constant mesh, a sliding spur-wheel on the driving-shaft, a spur-wheel on the counter-shaft with which the sliding spur-wheel on the driving-shaft engages, one or more spur-wheels on the driven shaft, one or more spur-wheels on the counter-shaft with which the spur-wheels on said driving-shaft engage, and means for locking the spur-wheel mounted at the junction of the driving and driven shafts to either of the said shafts, or to both, as set forth.

3. A change-speed gear comprising a driving and a driven shaft arranged in the same axial line and having their adjacent ends abutting or interengaging a spur-wheel mounted freely at the junction of the said shafts, means for positively connecting said spur-wheel to either or both of the said shafts, a counter-shaft parallel with the driving and driven shafts, three or more spur-wheels fixed on the counter-shaft one of which is constantly in mesh with the spur-wheel mounted at the junction of the driving and driven shafts, a spur-wheel mounted on the driving-shaft, means for causing the spur-wheel on the driving-shaft to either impart motion to one of the spur-wheels on the counter-shaft or to run idle with respect thereto, one or more spur-wheels on the driven shaft, and means for bringing said wheel or wheels into engagement with the spur wheel or wheels on the counter-shaft whereby the motion of said shaft is transmitted to the driven shaft, as set forth.

4. A change-speed gear comprising a driving and a driven shaft arranged in the same axial line and having their adjacent ends abutting or interengaging, a sleeve mounted freely at the junction of the said shafts a spur-wheel mounted freely on said sleeve, means for positively connecting said spur-wheel and sleeve to either or both of the said shafts, a counter-shaft parallel with the driving and driven shafts, three or more spur-wheels fixed on the counter-shaft one of which is constantly in mesh with the spur-wheel mounted at the junction of the driving and driven shafts, a sliding spur-wheel on the driving-shaft, means for causing said sliding spur-wheel to either impart motion to one of the spur-wheels on the counter-shaft or to run idle with respect thereto, one or more spur-wheels on the driven shaft, and means for bringing said wheel or wheels into engagement with the spur wheel or wheels on the counter-shaft whereby the motion of said shaft is transmitted to the driven shaft, as set forth.

5. The combination with a change-speed gear consisting of a driving and driven shaft in axial alinement, a counter-shaft parallel to said driving and driven shafts, a driving spur-wheel on the driving-shaft, a spur-wheel on the counter-shaft with which the driving spur-wheel on the driving-shaft engages and one or more trains of wheels connecting the counter-shaft with the driven shaft, of a second driving spur-wheel freely mounted at the junction of the driving and driven shafts, a spur-wheel on the counter-shaft with which said second driving-wheel permanently gears, means for locking said wheel to either of said shafts or to both whereby said wheel operates to give a second velocity ratio between the driving-shaft and the counter-shaft and enables a direct drive from the driving to the driven shafts to be obtained.

6. In a change-speed gear, the combination with a driving and driven shaft arranged in axial alinement, of a counter-shaft mounted parallel with the driving and driven shafts, three spur-wheels fixed on said counter-shaft, one free spur-wheel mounted at the junction of the driving and driven shafts and permanently in mesh with one of the wheels on the counter-shaft, and two sliding spur-wheels mounted respectively on the driving and driven shafts so as to rotate with said shafts and capable of meshing with two spur-wheels on the counter-shaft the said wheels having teeth or serrations on their bosses whereby they can be interlocked with the freely-mounted spur-wheels, as set forth.

7. In a change-speed gear, the combination with a driving and driven shaft arranged in axial alinement, of a counter-shaft mounted parallel with the driving and driven shafts, three spur-wheels fixed on said counter-shaft, one free spur-wheel mounted at the junction of the driving and driven shafts and permanently in mesh with one of the three spur-wheels on the counter-shaft, two sliding spur-wheels mounted respectively on the driving and driven shafts so as to rotate with said shafts and capable of meshing with the other two spur-wheels on the counter-shaft the said wheels having teeth or serrations on their bosses whereby they can be interlocked with the freely-mounted spur-wheels, a second counter-shaft, and two spur-pinions carried thereby one of which is in permanent mesh with the wheel on the first counter-shaft with which the sliding wheel on the driving-shaft engages and the other of which gears with the sliding wheel on the driving-shaft, as set forth.

8. In a change-speed gear, the combination with a driving and driven shaft arranged in axial alinement, of a counter-shaft mounted parallel with the driving and driven shafts, four spur-wheels fixed on said counter-shaft, a free spur-wheel mounted at the junction of the driving and driven shafts and permanently in mesh with one of the wheels on the counter-shaft, a free spur-wheel on the driven shaft permanently in mesh with one of the wheels on the counter-shaft, and two sliding spur-wheels mounted respectively on the driving and driven shafts so as to rotate with said shafts and capable of meshing with two spur-wheels on the counter-shaft the said wheels having teeth or serrations on their bosses whereby they can be interlocked with the freely-mounted wheels, as set forth.

9. In a change-speed gear, the combination with a driving and driven shaft arranged in axial alinement, of a counter-shaft mounted parallel with the driving and driven shafts, four spur-wheels fixed on said counter-shaft, a free spur-wheel mounted at the junction of the driving and driven shafts and permanently in mesh with one of the three spur-wheels on the counter-shaft, a free spur-wheel on the driven shaft permanently in mesh with one of the wheels on the counter-shaft, two sliding spur-wheels mounted respectively on the driving and driven shafts so as to rotate with said shafts and capable of meshing with the other two spur-wheels on the counter-shaft, the said wheels having teeth or serrations on their bosses whereby they can be interlocked with the freely-mounted wheels a second counter-shaft, and two spur-pinions carried thereby one of which is in permanent mesh with the wheel on the main counter-shaft with which the sliding wheel on the driving-shaft engages and the other of which gears with the sliding wheel on the driving-shaft, as set forth.

SWINFEN BRAMLEY-MOORE.

Witnesses:
A. MILLWARD FLACK,
G. V. SYMES.